United States Patent [19]

Li et al.

[11] 4,137,281

[45] Jan. 30, 1979

[54] IMPACT-RESISTANT, HIGH SOFTENING MALEIC ANHYDRIDE COPOLYMERS

[75] Inventors: George S. Li, Aurora; Richard J. Jorkasky, II, Walton Hills, both of Ohio

[73] Assignee: The Standard Oil Company, Cleveland, Ohio

[21] Appl. No.: 842,019

[22] Filed: Oct. 14, 1977

[51] Int. Cl.$^2$ ............................................. C08F 279/02
[52] U.S. Cl. ................................. 260/878 R; 260/879; 260/880 R; 260/885
[58] Field of Search ............... 260/878 R, 879, 880 R, 260/885; 526/272

[56] References Cited

U.S. PATENT DOCUMENTS

| 3,297,654 | 1/1967 | Barr | 526/272 |
| 3,708,555 | 1/1973 | Gaylord | 260/878 R |
| 3,919,354 | 11/1975 | Moore | 260/880 R |

Primary Examiner—Paul R. Michl
Attorney, Agent, or Firm—John F. Jones; Larry W. Evans

[57] ABSTRACT

High softening polymeric compositions having good impact resistance are composed of polymerized maleic anhydride, an alpha-olefin such as diisobutylene, styrene and a preformed diene rubber such as a styrene-butadiene rubber.

10 Claims, No Drawings

IMPACT-RESISTANT, HIGH SOFTENING MALEIC ANHYDRIDE COPOLYMERS

The present invention relates to novel polymeric compositions which have high softening temperatures and excellent resistance to impact, and more particularly pertains to such compositions which are composed of maleic anhydride, styrene, an alpha-olefin such as diisobutylene, a rubber such as a styrene-butadiene rubber and to a process for preparing these compositions.

The base copolymers of styrene, maleic anhydride and alpha-olefins such as diisobutylene have been described previously in Belgian Pat. No. 631,041. The present invention is an improvement over the prior art in that it provides impact-resistant resins.

The novel polymeric products of this invention are prepared by polymerizing maleic anhydride, styrene and the alpha-olefin in the presence of a rubber.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is solution polymerization in an organic solvent in the presence of a free-radical initiator and in the substantial absence of molecular oxygen in the temperature range of from about 0° to 100° C. Suitable solvents include methyl ethyl ketone, acetone, acetonitrile, toluene and benzene. Most preferred solvent is methyl ethyl ketone.

The preferred polymeric compositions embodied herein are those resulting from the polymerization of 100 parts by weight of (A) from 0 to 70% by weight of styrene, (B) from 10 to 55% by weight of maleic anhydride, and (C) from 5 to 50% by weight of diisobutylene wherein the sum of (A) plus (B) plus (C) is always 100%, in the presence of from 1 to 40 parts by weight of (D) a member selected from the group consisting of (1) a rubbery polymer of from 50 to 100% by weight of at least one member selected from the group consisting of butadiene and isoprene and from 0 to 50% by weight of at least one member selected from the group consisting of an olefinic nitrile such as acrylonitrile, an ester of an acrylic acid such as ethyl acrylate, and styrene, (2) a homopolymer of an ester of an acrylic acid such as polyethyl acrylate, (3) chlorinated butyl rubber, and (4) ethylene-propylene rubber.

The invention can be illustrated in the polymerization of a mixture of styrene, maleic anhydride and diisobutylene in the presence of a rubbery copolymer of styrene and butadiene in methyl ethyl ketone to produce a polymeric product having a high ASTM heat-distortion temperature.

The alpha-olefins useful in this invention in addition to diisobutylene include the following: isobutylene, propylene, triisobutylene, dipropylene, 2-methyl-butene-1, 2,3,3-trimethyl-butene-1, 2,4-dimethyl-pentene-1, and the like. Most preferred are diisobutylene and dipropylene (2-methyl-pentene-1).

The novel polymeric products of this invention are readily processed thermoplastic materials which can be thermoformed into a wide variety of useful articles by any of the conventional ways employed with known thermoplastic polymeric materials, such as by extrusion, milling, molding, drawing, blowing, etc., into pipes, strands, sheets, films, bottles, and the like.

In the following illustrative examples, the amounts of ingredients are expressed in parts by weight unless otherwise indicated.

EXAMPLE 1

A. An interpolymer of 50 parts of styrene, 25 parts of maleic anhydride, 25 parts of diisobutylene and 15 parts of a styrene-butadiene (25:75) rubber was prepared in accordance with the present invention in the following manner. A polymerization reactor was charged with 50 parts of styrene, 15 parts of a 25:75 parts by weight copolymer of styrene:butadiene rubber and 75 parts of methyl ethyl ketone. The reactor contents were stirred under a nitrogen atmosphere and brought to 82° C., at which point this temperature and stirring were maintained, and a continuous feed of 25 parts of maleic anhydride, 25 parts of diisobutylene and 0.3 part of benzoyl peroxide in 25 parts of methyl ethyl ketone was added uniformly to the polymerization mixture over a period of 6 hours. The contents of the reactor were coagulated with the addition of methanol while stirring and the solid polymer was dried at reduced pressure to constant weight. The resulting polymer was found to have the following properties: ASTM heat-distortion temperature 157° C., flexural strength $7.32 \times 10^3$ psi, tensile strength $5.89 \times 10^3$ psi, and notched Izod impact strength 0.84 foot pounds per inch of notch.

B. A of this example was repeated except that no styrene-butadiene rubber was used to produce a polymer which is outside the scope of this invention which was found to have the following properties: ASTM heat-distortion temperature 141° C., flexural strength $4.82 \times 10^3$ psi, tensile strength $2.36 \times 10^3$ psi, and notched Izod impact strength 0.21 foot pounds per inch of notch.

EXAMPLE 2

The general procedure of Example 1A was followed to produce a resin from 50 parts of styrene, 23 parts of maleic anhydride, 27 parts of diisobutylene and 15 parts of 25:75 styrene:butadiene rubber. The polymerization reactor was charged with 50 parts of styrene, 75 parts of methyl ethyl ketone and 15 parts of the rubber, and the reaction temperature was about 81° C. The continuous feed was made up of 0.2 part of benzoyl peroxide, 23 parts of maleic anhydride, 27 parts of diisobutylene and 25 parts of methyl ethyl ketone and was added uniformly over a 2-hour period. The final polymer was found to have an ASTM heat-distortion temperature of 153° C., a flexural strength of $8.54 \times 10^3$ psi, a tensile strength of $6.52 \times 10^3$ psi, and a notched Izod impact strength of 0.89 foot pounds per inch of notch.

EXAMPLE 3

The general procedure of Example 1A was followed in the preparation of a resin by the polymerization of 25 parts of styrene, 40 parts of maleic anhydride, 35 parts of diisobutylene and 15 parts of 25:75 styrene:butadiene rubber. The polymerization reactor was charged with 35 parts of diisobutylene, 20 parts of toluene, 75 parts of methyl ethyl ketone and 15 parts of styrene-butadiene rubber. The reaction temperature was about 75° C. and the continuous feed of 25 parts of styrene, 40 parts of maleic anhydride, 0.3 part of benzoyl peroxide and 25 parts of methyl ethyl ketone was added uniformly to the polymerization mixture over a 6-hour period. The final polymer was found to have an ASTM heat-distortion temperature of 166° C., a flexural strength of 8.41 ×

$10^3$ psi, a tensile strength of $5.06 \times 10^3$ psi, and an Izod impact strength of 1.76 foot pounds per inch of notch.

EXAMPLE 4

The procedure of Example 1A was followed in the preparation of a resin by the polymerization of 60 parts of styrene, 20 parts of maleic anhydride, 20 parts of diisobutylene and 15 parts of a 25:75 styrene:butadiene rubber. The polymerization reactor was charged with 60 parts of styrene, 75 parts of methyl ethyl ketone and 15 parts of rubber. The reaction was carried out at 76° C. and the continuous feed which was made up of 0.2 part of benzoyl peroxide, 20 parts of maleic anhydride, 20 parts of diisobutylene and 25 parts of methyl ethyl ketone was added to the reaction mixture uniformly over a 5-hour period. The final polymer was found to have an ASTM heat-distortion temperature of 127° C., an ASTM flexural strength of $6.78 \times 10^3$ psi, an ASTM tensile strength of $4.67 \times 10^3$ psi, and a notched Izod impact strength of 1.90 foot pounds per inch of notch.

EXAMPLE 5

The general procedure of Example 1A was repeated in the preparation of a resin by the polymerization of 35 parts of styrene, 35 parts of maleic anhydride, 30 parts of 2-methyl-pentene-1 and 15 parts of 25:75 styrene:-butadiene rubber. The polymerization reactor was charged with 15 parts of rubber, 35 parts of toluene, 30 parts of 2-methyl-pentene-1 and 100 parts of methyl ethyl ketone. The polymerization reaction temperature was 73° C. and the continuous feed which was made up of 35 parts of styrene, 35 parts of maleic anhydride, 0.4 part of benzoyl peroxide and 25 parts of methyl ethyl ketone was added uniformly over a 5-hour period to the polymerization reaction mixture. The final polymer was found to have an ASTM heat-distortion temperature of 163° C., a flexural strength of $8.68 \times 10^3$ psi, a tensile strength of $6.38 \times 10^3$ psi, and a notched Izod impact strength of 0.67 foot pounds per inch of notch.

EXAMPLE 6

The general procedure of Example 1A was repeated in the preparation of a resin by the polymerization of 15 parts of styrene, 45 parts of maleic anhydride, 40 parts of 2-methyl-pentene-1 and 15 parts of 25:75 styrene:-butadiene rubber. The polymerization reactor was charged with 15 parts of rubber, 30 parts of toluene, 40 parts of 2-methyl-pentene-1 and 75 parts of methyl ethyl ketone. The reaction temperature was 74° C. The continuous feed which was made up of 15 parts of styrene, 45 parts of maleic anhydride and 0.3 part of benzoyl peroxide was added uniformly over a 6-hour period to the polymerization reaction mixture. The final polymer was found to have an ASTM heat-distortion temperature of 139° C., a flexural strength of $7.99 \times 10^3$ psi, a tensile strength of $5.33 \times 10^3$ psi, and an Izod impact strength of 1.88 foot pounds per inch of notch.

EXAMPLE 7

The general procedure of Example 1A was repeated in the preparation of a resin by polymerization of 46 parts of 2-methyl-pentene-1, 54 parts of maleic anhydride and 15 parts of a rubbery terpolymer of ethylene:-propylene:ethylidene norbornene in the weight ratio of 44:50:6. The polymerization reactor was charged with 15 parts of rubber and 125 parts of toluene and the rubber was allowed to dissolve with stirring. To the reaction mixture were then added 46 parts of 2-methyl-pentene-1 and 54 parts of maleic anhydride. The polymerization reaction was carried out at 81° C. The initiator was 0.4 part of benzoyl peroxide which was charged at reaction temperature and the total reaction time was 3.5 hours. The resulting polymer was found to have a heat-distortion temperature of 107° C., a tensile strength of $1.73 \times 10^3$ psi, and a notched Izod impact strength of 1.73 foot pounds per inch of notch.

We claim:
1. The resinous polymer composition resulting from the polymerization of 100 parts by weight of
   (A) from 0 to 70% by weight of styrene,
   (B) from 10 to 55% by weight of maleic anhydride, and
   (C) from 5 to 50% by weight of a member selected from the group consisting of isobutylene, propylene, diisobutylene, dipropylene, triisobutylene, 2,3,3-trimethyl-butene-1, 2,4-dimethyl-pentene-1, and 2-methyl-butene-1 in the presence of from 1 to 40 parts by weight of
   (D) a rubber selected from the group consisting of
      (1) a rubbery polymer of from 50 to 100% by weight of at least one member selected from the group consisting of butadiene and isoprene and from 0 to 50% by weight of at least one member selected from the group consisting of an olefinic nitrile, an ester of an acrylic acid, and styrene,
      (2) a homopolymer of an ester of an acrylic acid,
      (3) chlorinated butyl rubber, and
      (4) an ethylene-propylene rubber.
2. The composition of claim 1 wherein (C) is diisobutylene.
3. The composition of claim 1 wherein (C) is 2-methyl-pentene-1.
4. The composition of claim 1 wherein (D) is a copolymer of styrene and butadiene.
5. The composition of claim 1 wherein (D) is an ethylene-propylene rubber.
6. The process comprising polymerizing in an organic solvent in the presence of a free-radical initiator and in the substantial absence of oxygen in the temperature range of from about 0° to 100° C. 100 parts by weight of
   (A) from 0 to 70% by weight of styrene,
   (B) from 10 to 55% by weight of maleic anhydride, and
   (C) from 5 to 50% by weight of a member selected from the group consisting of isobutylene, propylene, diisobutylene, dipropylene, triisobutylene, 2,3,3-trimethyl-butene-1, 2,4-dimethyl-pentene-1, and 2-methyl-butene-1 in the presence of from 1 to 40 parts by weight of
   (D) a rubber selected from the group consisting of
      (1) a rubbery polymer of from 50 to 100% by weight of at least one member selected from the group consisting of butadiene and isoprene and from 0 to 50% by weight of at least one member selected from the group consisting of an olefinic nitrile, an ester of an acrylic acid, and styrene,
      (2) a homopolymer of an ester of an acrylic acid,
      (3) chlorinated butyl rubber, and
      (4) an ethylene-propylene rubber.
7. The process of claim 6 wherein (C) is diisobutylene.
8. The process of claim 6 wherein (C) is 2-methyl-pentene-1.
9. The process of claim 6 wherein (D) is a copolymer of styrene and butadiene.
10. The process of claim 6 wherein (D) is an ethylene-propylene rubber.

* * * * *